(12) United States Patent
Warwick et al.

(10) Patent No.: US 8,239,552 B2
(45) Date of Patent: Aug. 7, 2012

(54) PROVIDING CLIENT ACCESS TO DEVICES OVER A NETWORK

(75) Inventors: Alan Warwick, Bellevue, WA (US); Narasimham Ramasubramanian, Redmond, WA (US); Chung Lang Dai, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1437 days.

(21) Appl. No.: 10/645,087

(22) Filed: Aug. 21, 2003

(65) Prior Publication Data

US 2005/0044244 A1 Feb. 24, 2005

(51) Int. Cl.
*G06F 15/16* (2006.01)
(52) U.S. Cl. ...................................................... 709/229
(58) Field of Classification Search .................. 709/229, 709/225, 226, 223
See application file for complete search history.

(56) References Cited

U.S. PATENT DOCUMENTS

| | | | |
|---|---|---|---|
| 6,295,575 B1 * | 9/2001 | Blumenau et al. | 711/5 |
| 6,549,934 B1 | 4/2003 | Peterson et al. | 709/203 |
| 6,892,264 B2 * | 5/2005 | Lamb | 710/301 |
| 7,165,258 B1 * | 1/2007 | Kuik et al. | 719/326 |
| 7,275,103 B1 * | 9/2007 | Thrasher et al. | 709/224 |
| 2002/0156612 A1 * | 10/2002 | Schulter et al. | 703/23 |
| 2002/0156867 A1 * | 10/2002 | Iwami | 709/218 |
| 2003/0149753 A1 | 8/2003 | Lamb | |

FOREIGN PATENT DOCUMENTS

| | | |
|---|---|---|
| JP | 2002197051 | 7/2002 |
| JP | 2002344458 | 11/2002 |
| WO | WO 00/00881 | 1/2000 |
| WO | WO03/060688 | 7/2003 |

OTHER PUBLICATIONS

IP SAN—From iSCSI to IP-addressable Ethernet Disks, Peter Wang, Robert E. Gilligan, Henry Green, Jeff Raubitschek, 2003 Institution of Electrical Engineers Conference Proceedings.

An Analysis of Three Gigabit Networking Protocols for Storage Area Networks, Kaladhar Voruganti, Prasenjit Sarkar, 2001 Institution of Electrical Engineers Conference Proceedings.

Peabody: The Time Travelling Disk, Charles B. Morrey III, Dirk Grunwald, Institute of Electrical Engineers Conference Proceedings 2003.

A Perfomance Analysis of the iSCSI Protocol, Stephen Aiken, Kirk Grunwald, Andrew R. Pleszkun, Jesse Willeke, Institute of Electrical Engineers Conference Proceedings 2003.

(Continued)

*Primary Examiner* — John Macilwinen
*Assistant Examiner* — Bradford F Fritz
(74) *Attorney, Agent, or Firm* — Workman Nydegger (57) ABSTRACT

A centralized service identifies a pool of devices that can be accessed by clients over a network. Devices can include a local or network-accessible device, and a configurable file that represents a portion of a device (e.g., a SCSI storage device). In some cases, the devices (or the file representing a portion of the device) can be identified by an assigned logical unit number. The centralized service assigns one or more devices to a target, and associates client information with the target. The centralized service also can also assign the target a logical unit number, and assign the target to a protocol-independent portal, which further operates through protocol-dependent miniports. In one embodiment, a client accesses a network device by accessing the appropriate port through an appropriate miniport protocol (e.g., Ethernet, fiber channel, etc.), and by submitting appropriate target authorization.

33 Claims, 5 Drawing Sheets

OTHER PUBLICATIONS

Peer-to-Peer Communication for Virtual Industrial Devices, Manel Velasco, Pau Marti, Josep M. Fuertes, 4th IEEE International Workshop on Factory Communication Systems, Vasteras, Sweden, Aug. 28-30, 2002 pp. 55-62.

Technomagesinc, "Data Transport Processor Applications Overview", Retrieved from the Internet: URL:http://web.archive.org/web/20020809071759/www.technomagesinc.com/papers/DTP_Apps.html> Sep. 8, 200.

Technomagesinc, "Installation and Maintenance Manual", Retrieved from the Internet: URL:http://web.archive.org/web/20030627191726/www.technomagesinc.com/pdf/IS_Install_Manual.pdf>, Jun. 27, 2003.

Yoshida, Hu. "LUN Security Considerations for Storage Area Networks", Hitachi Data Systems, Jan. 1, 1999.

Shizuka Yoshino, "Validation, Windows Networking, What Is There Ahead of GUI? Second Installment, Automatically Generating an IP by Using a DHCP," *NETWORK World*, vol. 7, No. 9, pp. 178-183 (pp. 178-179 in particular), IDG Japan, Inc., Sep. 1, 2002.

\* cited by examiner

PROVIDING CLIENT ACCESS TO DEVICES OVER A NETWORK

BACKGROUND OF THE INVENTION

1. The Field of the Invention

This invention relates generally to systems, methods, and computer program products for providing client access to one or more devices over a network, such as in a storage area network, and more particularly to methods and systems for providing a client with network device access based in part on the accessing client's identity.

2. Background and Relevant Art

Computerized systems are increasingly common, in part because computerized systems automate much of what people previously had to perform manually. Computerized systems do so in part by including many different types of automated devices within a single or minimal number of structures, such as a computer case or a workstation. For example, a computerized system such as a desktop or laptop computer can include a Central Processing Unit (CPU) for processing data, a hard drive, Random Access Memory (RAM), Read Only Memory (ROM), a floppy disk drive, and a Compact Disc Read-Only-Memory (CDROM) drive, or Compact Disc Rewriteable (CDRW) drive, etc. for storing data; and include various hardware interfaces such as Peripheral Device Interconnect (PCI) cards that provide interfaces for external data transmissions.

Each such device is connected typically to a computerized system through another centralized unit (e.g., a "motherboard") within the computerized system. The device often can be internally connected to a motherboard through, for example, male and female Small Computer System Interface (SCSI) connectors. In some cases, however, a device can be externally connected to the computerized system (e.g., externally connected hard drive or CROM) through male and female Universal Serial Bus (USB) connectors. Some examples of devices that are more commonly externally connected with the computerized system include a printer, a monitor, a keyboard, a modem, and, in more complicated systems, backup media such as large tape storage devices.

As a typical user (or "client") or organization desires to add functionality to their computerized system(s), the client or organization can discover a few disadvantages to simply adding additional devices to each computer system. One obvious disadvantage is that installing multiple devices on systems can create exponential cost issues, particularly in the case of an organization implementing multiple computerized systems. In addition, installing devices internally allows devices to be centralized, but requires a working knowledge of opening computerized systems and installing the devices, as well as varying degrees of time and effort.

By contrast, using externally-connected devices tends to be much easier than installing devices internally, though other disadvantages can be present. For example, a user can desire to add a large hard drive through a USB connection, but the user has already filled the computer's only two USB ports with a printer and a scanner. Alternatively, an externally-connected device can suffer from performance issues due to slower data transfer and process rates compared to if the device were connected internally. Even still, adding multiple, externally-connected devices to computerized systems can unnecessarily clutter the client's workspace. Accordingly, a client or organization can need to make difficult evaluations to determine which devices to purchase, how many devices to purchase, and how the devices should be connected to computerized systems to accommodate workspace and performance concerns.

Compounding cost disadvantages is the situation where a given user can only need a desired device infrequently, or in the case of a large organization, many of the intended clients can have varying degrees of need for each of the different devices. For one example, an organization can spend a certain amount of money to provide all client systems with 100 gigabyte hard drives, though some clients in the organization can need less than 1 gigabyte of storage space, others can need 5 gigabytes, and yet others can need a full 100 gigabytes (or more) of storage space routinely. As well, some clients in an organization can require access to backup systems, where some of the clients can need the backup systems once a month, and yet others can need the backup systems several times a week. Accordingly, it is a disadvantage in terms at least of cost and efficiency to provide all clients with the same numbers and types of devices, as well as full access to each device's capabilities.

Presently, some current approaches attempt to address the foregoing problems in part by allowing clients to access devices over a Local or Wide Area Network (LAN or WAN). For example, the Internet Small Computer System Interface (iSCSI) allows clients to access SCSI devices over a LAN or WAN by sending SCSI commands over the network. In addition, it is common now for operating systems to incorporate some generic types of network file and printer sharing. While these approaches can provide some cost savings by obviating the need to purchase redundant devices, there remain some disadvantages to these approaches. For example, such approaches tend to treat network clients with a one-size-fits-all access to a given device, such that, as long as the client has access to the network, the client has either complete access to the device, or no access at all, depending on how one administers permissions for the client and/or device.

In addition, present approaches tend to be limited in how they can accommodate newer or multiple connection protocols. For example, some approaches will treat a different connection protocol by allowing the different connection protocol (e.g., a fiber channel connection protocol) through a separate connection port at the network provider, if they can accommodate the different connection protocol at all. Such approaches, however, are less ideal since a network provider may wish to limit certain clients to accessing only certain ports, or the network provider can be limited in the number of new ports the provider can allocate. Accordingly, present approaches do not provide sufficient granularity by which a network provider can provide client access to network devices.

What is needed, therefore, are systems and methods that allow clients to access devices over a network so that a user or an organization is not required to purchase multiple devices. In particular, such systems and methods should be configurable to allow clients varying degrees of access to different types of devices based on a given client's identity. In addition, such systems and methods should be able to accommodate device access for a variety of connection protocols, such that the client device access options can be broadened, or narrowed on a situational basis.

BRIEF SUMMARY OF THE INVENTION

The present invention relates generally to methods, systems and computer program products for providing client access to computerized system devices over a LAN or WAN, where the access is based at least in part on the client's identity.

According to one aspect of the invention, devices that are accessible on a network can be identified or represented as part of a particular group, or "target". In this manner, clients can be assigned and removed from the target, and devices can be represented in different ways so that different clients can access different devices with varying degree.

In one embodiment, a centralized service identifies one or more devices that are available locally, or via a network (e.g., LAN or WAN), and identifies the device with a device identifier, such as a Plug and Play (PnP) identifier, a symbolic link, a complete file system path, etc. In some cases, the centralized service can use a file or partition to represent only a portion of the device, and assign the file its own device identifier. Since the client interacts with the file as though it were the device, rather than the device itself, the file created by the centralized service is sometimes referred to herein as a virtual device. The centralized service then allocates a set of device identifiers as part of a target. The centralized service can generate a target for any given network client, or can create a target that can be accessed by a group of clients.

In addition, the centralized service maintains a pool of client identities and client permissions received from an internal database, such as a directory service, or can receive the client identities and client permissions through a third party database that the centralized service accesses over a network. The centralized service then uses the information from this pool to assign one or more clients to any given target. This allows the centralized service to provide the client access only to the devices identified in the target to which the client has been assigned.

The centralized service can also provide client access to any given target through one or more network ports. The protocol-independent port driver can interface with protocol-dependent mini-port drivers as plug-ins to the protocol-independent port driver, such that the client can access the target through any protocol such as a fiber channel connection, Ethernet, or other protocol, etc. In addition, since the centralized service provides client access only through specific ports (and protocols), the clients that do not have access to the specified network ports (and protocols) cannot therefore access the target provided through the specified network ports. This enhances the distinctions the centralized service can make between various clients, and enhances the type of device access an administrator can provide to different clients.

Additional features and advantages of the invention are set forth in the description which follows, and in part will be obvious from the description, or can be learned by the practice of the invention. The features and advantages of the invention can be realized and obtained by means of the instruments and combinations particularly pointed out in the appended claims. These and other features of the present invention will become more fully apparent from the following description and appended claims, or can be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for providing client access to devices over a network.

According to one aspect of the invention, a centralized service allocates one or more device identifiers into a target. The device identifiers can identify an actual device, or a file or partition on a device that represents a portion of the device. The centralized service then provides client access to the devices (e.g., partition, or file-based devices) by configuring client access to the target based on the client's identity or access permissions, and by providing access to the targets through specific ports at the network provider. Additional features and advantages of the invention will be set forth in the description which follows.

The embodiments of the present invention can comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
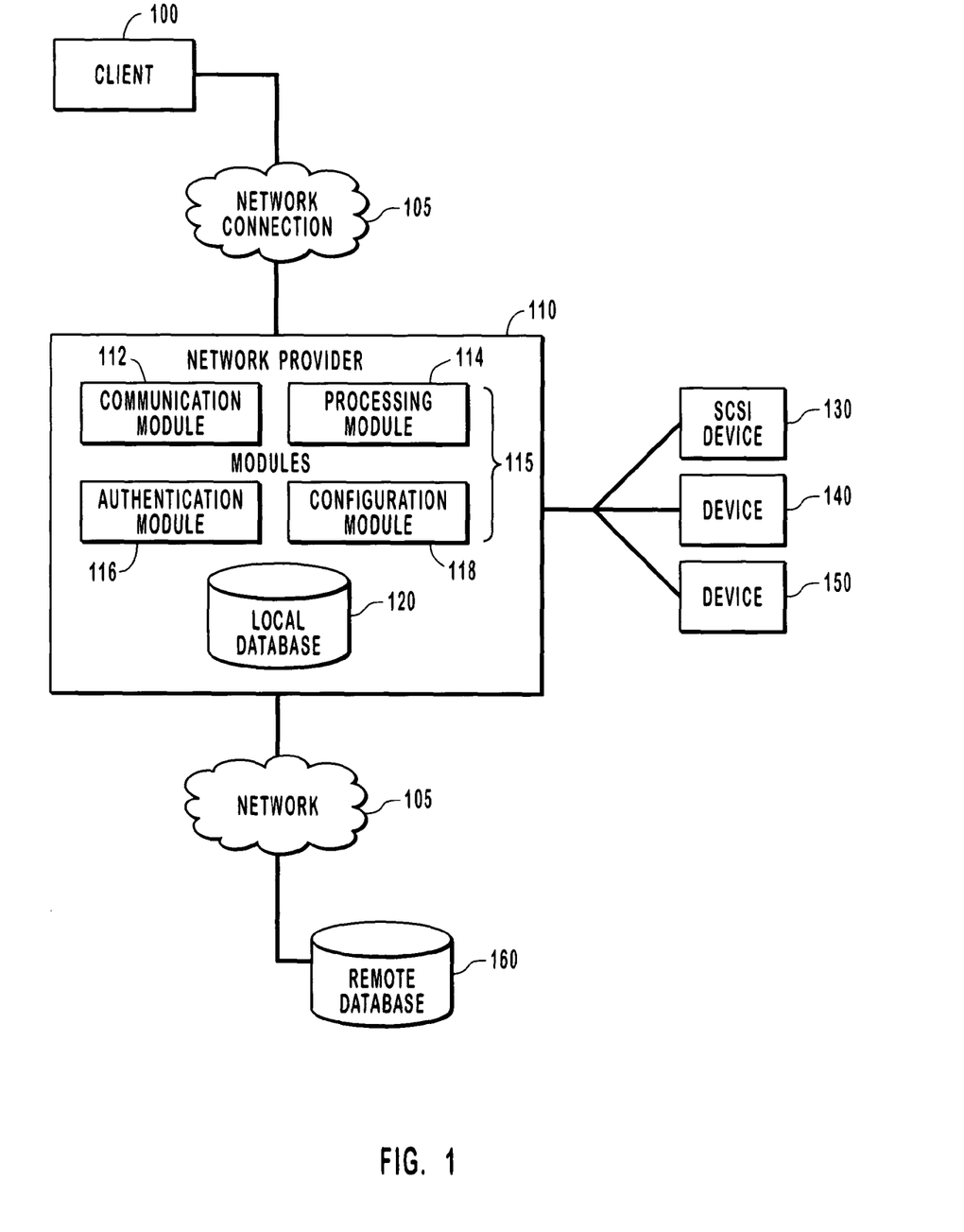
FIG. 1 illustrates a generalized block diagram for providing a client access to one or more devices through a network provider over a network.

FIG. 1 illustrates a generalized block diagram for providing a client access to one or more devices through a network provider over a network. As shown, a client 100 accesses a network provider 110 through a network connection 105. The network connection 105 can be made using any type of protocol such as a standard Ethernet, Token Ring, fiber channel, USB, or wireless network connection, and allows the client 100 to interface with other devices on the network through a network provider 110. As will be shown in the following discussion of an embodiment of the invention, the protocol through which the client communicates with the network provider 110 can vary.

The network provider 110 can include a centralized service in the form of several modules 115 for administering the network, including a communications module 112, a processing module 114, an authentication module 116, and a configuration module 118, and so forth. A communications module 112 can be used, for example, to process communications between client 100 and network provider 110 over the network connection 105. A processing module 114 can be used, for example, for relaying or processing commands intended for an attached device. An authentication module 116 can be used to receive and/or organize authentication information from a local database 120, or a remote database 160. And a configuration module 118 can be used, for example, to receive configuration information that, combined with authentication information in authentication module 116, dictates how a client 100 accesses a remote device.

In accordance with the present invention, the combination of these modules can be used on the network provider 110 for administering clients and accessible devices on the network, such as SCSI device 130, as well as devices 140, and 150. Devices 130, 140, and 150 can each be devices connected directly to the network provider 110 through a SCSI connection, but can also be devices that are connected through a SCSI connection to another computer on the network. In addition, while these devices 130, 140, and 150 can each be described as SCSI devices for the purposes of this invention, it is not critical that they are all SCSI connected devices. For example, the devices could be a RAM disk, or could be devices that can be connected to the network provider 110 or another remote computer (not shown) through a network interface cable, through a USB connection, a fire wire connection (Institute of Electrical and Electronics Engineers—IEEE-1394), a parallel interface connection, a serial interface connection, an Attachment Packet Interface (ATAPI), etc. In any such case, the respective device should be accessible locally or through a network protocol.

In addition, the local database service 120 can maintain a pool of client identities and permissions. The local database 120 can be a directory service on the network provider 110 (e.g., a MICROSOFT® EXCHANGE SERVER® database, a MICROSOFT® ACTIVE DIRECTORY® database, etc.). Alternatively, local database 120 can receive the identities and permissions from a remote database 160 over a network connection 105, when the database resides remotely on a different network computer, such as a dedicated network database. These identities and permissions can include such myriad things as user name and password, contact information, work group information, network identity, and so on. The centralized service can also use the different types of identities and permissions to organize the client information into different sets.

In addition, the local database 120 and centralized service (e.g., set of modules 115) can maintain a list of device identifiers that identify devices that can be accessed over the network 105, which can also be allocated into different sets, as in the case of client identities. The local database 120 and centralized service can also assign each device identifier to a corresponding Logical Unit Number (LUN). By way of explanation, a LUN is a unique identifier used on a SCSI bus that enables the SCSI bus to differentiate between several devices.

Rather than simply identifying a device, however, the centralized service can also create a separate partition or file for a device, where the partition or file can ultimately be identified by an assigned LUN, as will be discussed in greater detail in FIG. 3. Since a partition or file can be easily configured, a partition or file based SCSI device provides an advantageous way of granting client access only to portions of a device. A partition or file can also be used to allow a disk device to emulate another device type (e.g., a magnetic tape) Accordingly, the centralized service on the network provider 110 uses the information received about clients and devices to provide one or more clients, e.g. client 100, with configurable access to a device, e.g., SCSI device 130.

Figure 2:
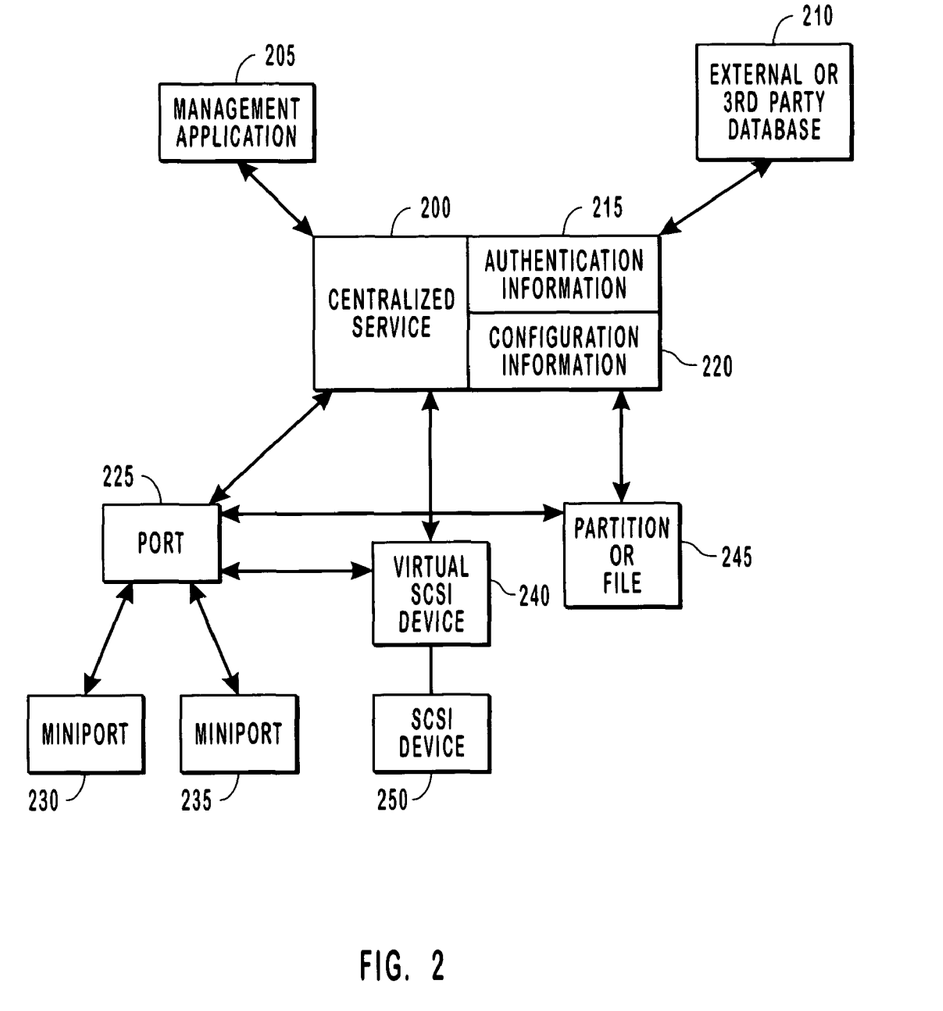
FIG. 2 illustrates one embodiment of the present invention with a block diagram that interrelates a centralized service with configuration information, and device access through a port.

FIG. 2 illustrates a more particular embodiment of the present invention showing various components and modules for providing a client with device access. As illustrated, the inventive system can include a centralized service 200. Accordingly, centralized service 200 is shown having authentication information 215, and configuration information 220, which have been described above. The authentication information 215 can include username and password information for various network clients, and can further include work group identities, network locations, physical locations, and so on, as in the case of a contact database. Configuration information 220 can include information regarding how the authentication information 215 is used to provide any given client access to a device.

As already described, the authentication module 116 can receive the authentication information 215 from a local contact database (e.g., 120, FIG. 1) stored at a network provider 110, or can receive the information from an external or third party database 210 (e.g., from remote database 160, FIG. 1). This can also be true for configuration information 220. For example, in an organization, one server providing network service and device access can be separate from a server that provides contact and permissions information. An administrator can use a management application 205 (locally on the network provider, or remotely over a network) to manage how the centralized service 200 implements the authentication 215 and configuration information 220. Alternatively, the administrator can use the management application 205 to change identity and grouping information within each module (215, 220, etc.).

Ultimately, the centralized service 200 provides device access information to one or more ports 225 through one or more corresponding miniports 230, 235 found at the network provider. Generally speaking, a port is a logical connection place through which a client gains access to a particular device or program, e.g., a program at a network provider. A port can be exposed using any different protocols such as TCP/IP, UPD/IP, IEEE 1394, USB, and others. For example, a network provider can provide a client with access to a network database program when the client requests the Uniform Resource Locator (URL): http://10.1.1.1:2050, where 2050 represents an arbitrary port number and 10.1.1.1 represents an arbitrary Internet Protocol (IP) address in version 4 format (IPv4). Of note, for the TCP/IP protocol there can be 65,000+ TCP ports possible that can be assigned to a specific IP address, though some ports are typically reserved for use by certain services (e.g., port 80 is reserved for HyperText Transfer Protocol—HTTP).

A network provider can therefore grant a client access through a reserved port (such as port 3260 in the case of iSCSI), or can give other application processes port numbers for each connection dynamically on a per-connection basis. Thus, it is understood that the centralized service 200 can provide network access through multiple ports. This is similar to "portals" in the iSCSI protocol. In iSCSI, the iSCSI portal is an IP address and Transmission Control Protocol (TCP) socket number combination. For fibre channel protocols, the equivalent of a port or portal is a World Wide Name (WWN). One will appreciate, however, that the present invention is described primarily in terms of a network port, though only for purposes of convenience. That is, any client desiring to access that network provider (or device provided through the network provider) must, therefore, request to connect to the appropriate port, portal, and/or WWN, as appropriate, as will be described in greater detail below.

Continuing with FIG. 2, the centralized service 200 provides device access ultimately through a port driver 225. Port drivers are common with SCSI based storage devices, though they can be present for other devices as well. Thus, for example, a SCSI port driver provides support for Input/Output (I/O) over the SCSI bus. In the case of USB devices, a hub and a host controller driver conjunctively perform the duties of the port driver. In most cases, port drivers are protocol-independent partly since they are provided in advance by the operating system to handle a variety of different protocols.

The present invention, however, provides for miniport drivers, which are normally created by a network and storage device manufacturer (e.g., manufacturer of a Network Interface Card—NIC) to implement additional, specific data traffic protocols. The miniport drivers for miniports 230 and 235 operate as plug-ins to the port driver allowing the port driver to remain protocol-independent. This provides a number of benefits related at least in part to protocol flexibility for future protocols, or changes in existing protocols. For example, one client with wireless access, another client with Ethernet access, another client with USB access and another client with fiber channel access (each communicating through different protocols) can connect to the network provider through the same port driver, assuming the appropriate miniport drivers are available.

This also allows the centralized service to allocate clients and targets more cleanly among the different ports while avoiding additional connection protocol considerations. For example, the network provider can allocate client port access by a client's workgroup (similar to Virtual Local Area Networks—VLANs) such that all clients belonging to a "Marketing" workgroup connect to the network provider only through port 3000, whereas all clients belonging to a "Research" workgroup can connect to the network provider through port 4000. The network provider can also allocate port access by a client's physical or network location, or, if appropriate, by connection protocol, etc. Furthermore, the centralized service can also handle the configuration of the iSCSI login redirection for failover and load balancing.

FIG. 2 also shows a virtual SCSI device 240 that interfaces directly with a SCSI or other type of device 250, as well as a partition or file 245 that can interface directly with, for example, a partition manager or a file-system-based storage device. In one embodiment, the file system can be a New Technology File System (NTFS), although the file system can be any one of a variety of file systems that may be used with a given device. The virtual SCSI device 240 is more of a generic, indirect access point to the entire SCSI device 250. The partition or file 245, however, is a representation of a portion of the device or file system, where the portion is based in part on configuration information 220. Thus, for example, the partition or file 245 can represent 50 gigabytes of space on the device or file system, though an administrator can later alter the configuration information 220 through management application 205 so that the partition or file 245 represents only 20 gigabytes of space on the device or file system. Using a configurable partition or file 245 in this manner is one way in which the present invention can conserve costs: by providing several storage options to multiple clients based on individual client needs, without requiring the administrator to purchase multiple storage devices.

In one embodiment, the centralized service 200 identifies both of the virtual SCSI device 240 and the partition or file 245, rather than necessarily the underlying devices. Thus, the virtual SCSI device 240 and partition or file 245 provide "virtualization information", or indirect access points to underlying devices. For example, a device identifier will identify the virtual SCSI device 240, and not therefore the SCSI device 250 directly; and another device identifier and partition or filename would identify the partition or file 245 rather than the specific device or file system volume directly. The centralized service 200 then provides client access to the respective devices by assigning LUNs for the partition or file 245 to a target and then assigning that target to a specific port through the port driver 225. As will be understood more fully from the present disclosure, the centralized service provides this information through the port driver 225 by assigning to the respective port collections of LUNs and device identifiers (and other client information) in the form of targets.

Figure 3:
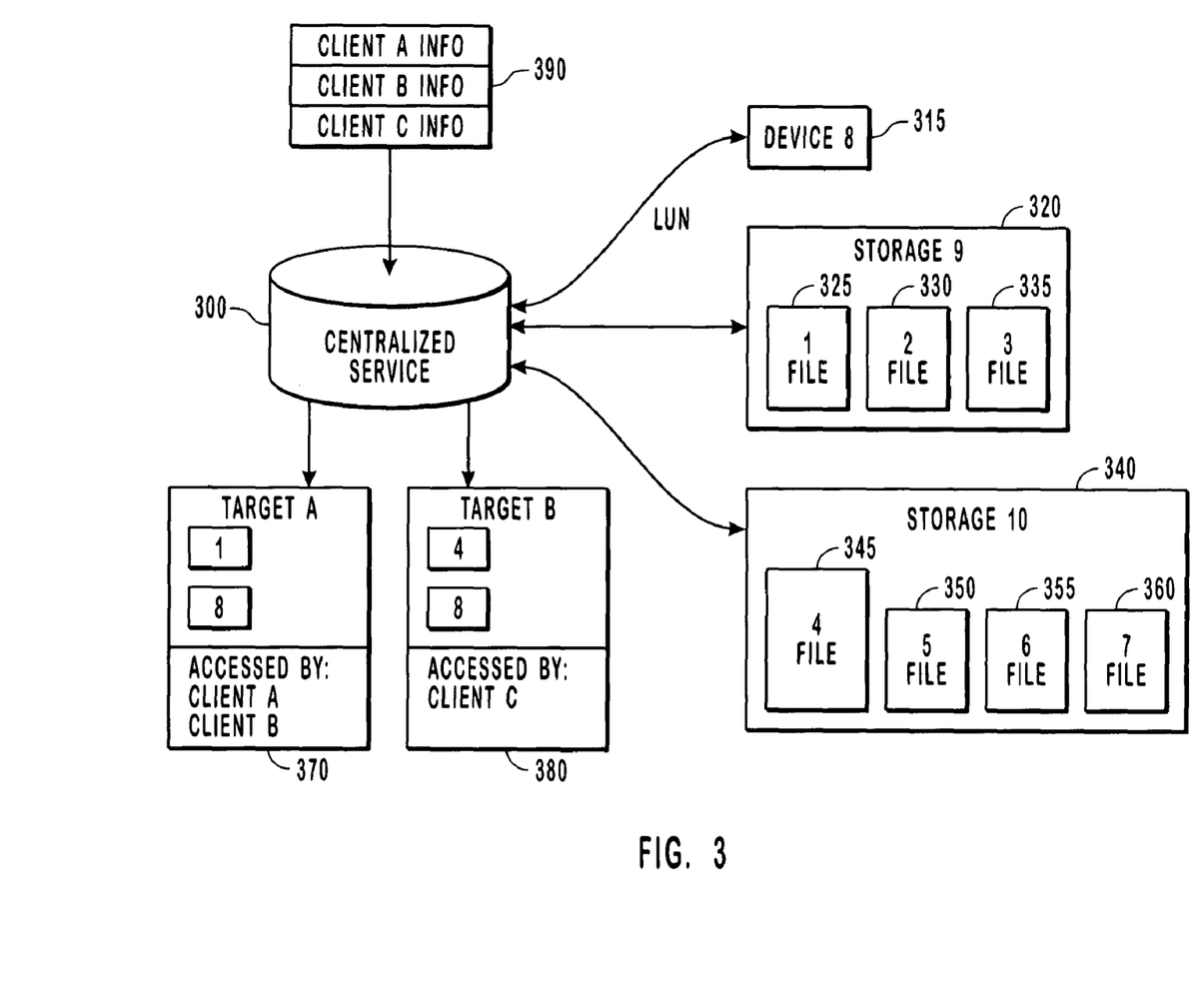
FIG. 3 illustrates an embodiment of the present invention with a block diagram that relates a centralized service with targets, clients, and devices.

FIG. 3 illustrates one embodiment of the present invention for gathering device and client information into targets. As described in the preceding figures, a device can be represented in terms of an assigned LUN. FIG. 3 shows a device 315 having a LUN of "8", a storage device 320 having a LUN of "9", and a storage device 340 having a LUN of "10". Both storage devices 320 and 340 can each be apportioned into one or more partitions or files (e.g., 245) 325, 330, 335, 345, 350, 355, 360, where a centralized service 300 can identify each partition or file with a respective device identifier and partition or filename, and in turn assign the device identifier and partition or filename to a LUN, such as a LUN of "1", "2", "3", "4", "5", "6", and "7". The LUN number is only relevant within a target. Thus, the same LUN may be in different targets and have different LUN numbers in each target.

As discussed, each partition or file in the present embodiment represents a configurable storage space allocation so that a client can access the respective storage only in terms of how the partition or file has been configured. For example, storage 320 is shown divided into three equally-sized files (325, 330, and 335). If files 325, 330 and 335 are each configured for 25 gigabytes of space, a client who can access file 325 will view storage 320 as offering only 25 gigabytes of space, when in reality storage 320 has a total capacity of 75 gigabytes of space. Similarly, storage 340 can be divided into four files (345, 350, 355, and 360) where file 345 is shown as a larger file, and files 350, 355, and 360 are shown as smaller, equally-sized files. A client that can access file 345 can view storage 340 as a 60 gigabyte storage space, and a client that can access file 350 can view storage 340 as a 20 gigabyte storage space, though storage space 340 has an actual storage capacity of 100 gigabytes.

As described previously, the centralized service 300 can configure the individual allocations for the partitions or files, can simply identify the LUNs for all accessible devices and files, can configure how each device should be accessed, or can perform any combination of the preceding, etc. In the present embodiment, the centralized service 300 identifies the pool of device identifiers of all devices that are available to the service, and assigns a set of LUNs as appropriate. The centralized service also maintains a pool of all received client information 390. The centralized service uses this client and device information to allocate one or more of the identified LUNs into one or more targets 370 and 380, and to associate the targets 370, 380 with client access information (e.g., as provided from Authentication 215).

Thus, as shown in the embodiment of FIG. 3, Target A 370 can be accessed by Clients A and B, which allows Client A and Client B to access device 315, as well as a portion of storage 320 through file 325. Note that Target A could instead have different lists of LUNs for Client A and Client B. Similarly, Target B 380 allows Client C to access device 315 and storage 340 through file 345. Client A, Client B, and Client C, therefore, each have access to device 315. However, Clients A and B share 25 gigabytes of storage space through file 325, while Client C has sole use of 60 gigabytes of storage space 340 through file 345. Clients A, B, and C, are therefore limited to accessing only those devices represented in their respective group, as allocated by the centralized service 300.

The present invention also can be described in terms of methods comprising functional steps and/or non-functional acts. The following is a description of acts and steps, with some reference to the preceding figures that can be performed in practicing the present invention. Usually, functional steps describe the invention in terms of results that are accomplished, whereas non-functional acts describe more specific actions for achieving a particular result. Although the functional steps and non-functional acts can be described or claimed in a particular order, the present invention is not necessarily limited to any particular ordering or combination of acts and/or steps.

Figure 4:
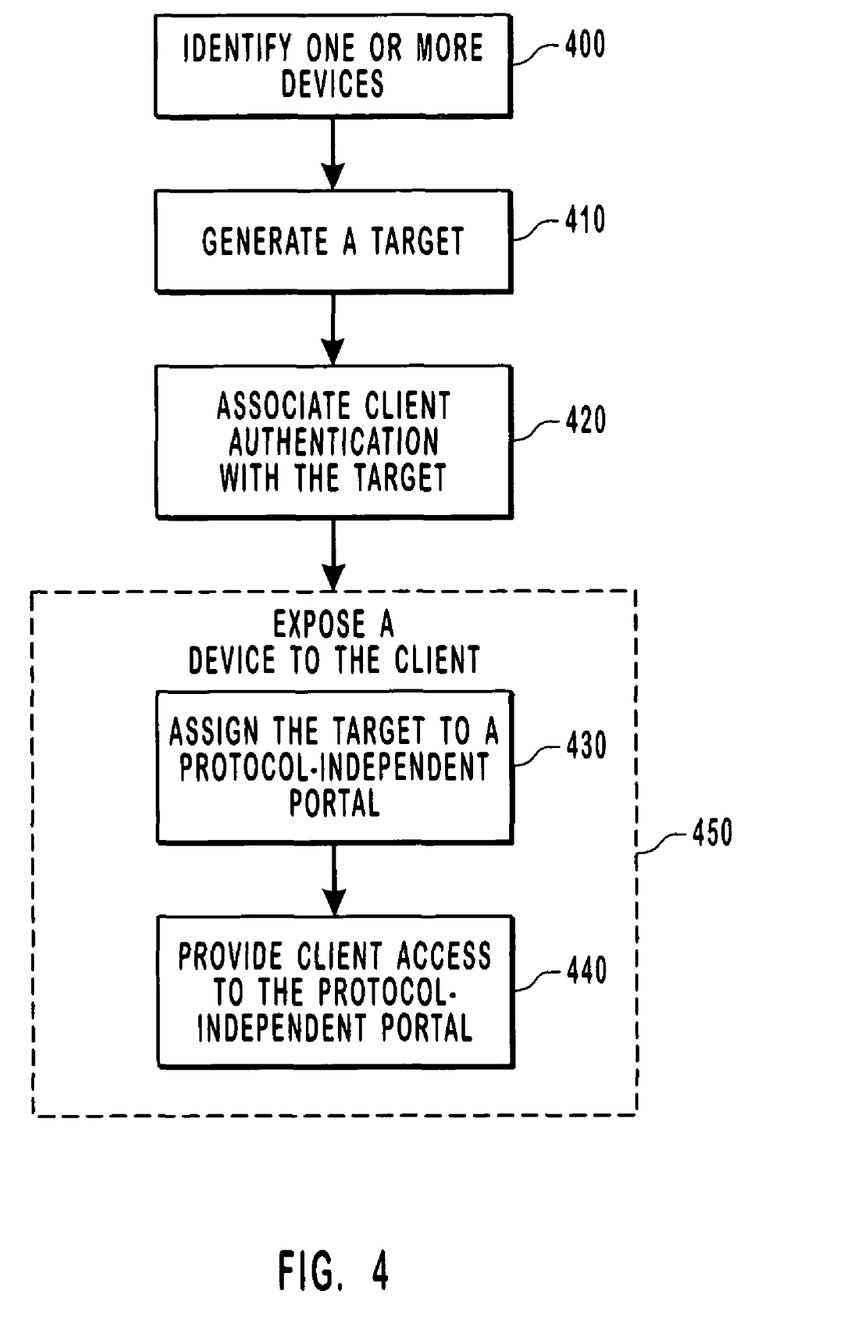
FIG. 4 illustrates a flowchart of a method for providing a client system access to one or more network devices over a network through a network provider.

FIG. 4 illustrates a flowchart of a method for providing a client system access to one or more devices over a network through a network provider. As shown, the inventive method can be implemented by first performing an act of identifying 400 one or more devices. Act 400 includes identifying one or more devices that can be accessed. For example, a centralized service 300 can identify all accessible devices as per their respective device identifiers, where the identifiers can represent devices (e.g., via a virtual SCSI device 240), or can represent a portion of a storage device (e.g., via a SCSI partition or file 245). The centralized service 300 can also create new devices.

As the devices have been identified (or created in some cases), the method can be implemented by performing an act 410 of generating a target (e.g., 380). Act 410 includes generating a target that identifies at least one of the one or more devices, and that includes at least one corresponding device identifier. For example, the centralized service 300 can generate a target 380 that includes reference to a device (e.g., device 315) by referencing the device's 315 corresponding device identifier. Alternatively, the centralized service 300 can create a target 380 that identifies a device without reference to a LUN, but includes reference to a device identifier for a partition or file 245.

The inventive method also comprises an act 420 of associating client authentication with the target. Act 420 includes associating client authorization information identified by the network provider with the target that identifies the at least one network device. For example, the centralized service 300 can receive client information 390 (e.g., "AUTHENTICATION" 215) locally, or from a remote third party database 210. In the case of target 380, the centralized service then associates the appropriate client information 390 with the target (e.g. "ACCESSED BY: CLIENT C") so that only the specifically-authorized client(s) (e.g., "CLIENT C") can access the devices (e.g., "4", "8") identified by the target. Similarly, verifying the authorization information received from the client when it is logging into the target can be done locally or at the remote database.

The inventive method further comprises a functional step 450 of exposing a network device to the client (e.g., client 100). Step 450 includes exposing the at least one device to the client through a specific one of a network port, a WWN, and a portal, such that the client can access the at least one device identified by the target when the client has access to the specific one of a network port, a WWN, and portal, and when the client presents the associated client authorization to the network provider. Functional step 450 can be accomplished by performing the specific act 430 of assigning the target to a port via the protocol-independent port driver. Act 430 assigning the target to a port through a protocol-independent port driver at the network provider. For example, the centralized service 200 can assign target 380 to be client-accessible through a port (such as an iSCSI portal or a Fibre Channel WWN). Thus, if the port is dedicated to a specific workgroup or application, only those clients authorized on the specific workgroup or application can access targets 380 through the port as managed through one or more of the respective miniports 230, 235, etc.

Functional step 450 can be further implemented by performing the specific act 440 of providing client access to the port. Act 440 includes providing client access to the specific one of a port, a WWN, and a portal through the protocol-independent port driver, such that the protocol-independent port driver is accessed through one or more protocol-dependent mini-ports. Thus, the client can access the port target 380 through a port when the appropriate miniport 230, 235 driver is present as a plug-in to the port driver 225 driver. This allows a client 100 to access port driver 225 through multiple protocols, such as an Ethernet, fiber channel, and/or wireless protocol. Alternatively, if miniport drivers for miniports 230 and 235 support Ethernet and fiber channel data connections respectively, but client 100 wishes to make a network connection 105 only through a wireless protocol, the client will still not be able to access the appropriate target since the wireless miniport driver is not present in that case. This embodiment of the present invention, therefore, provides a flexible and granular way to allow specific client access of devices, and portions of devices, while significantly reducing the overhead and costs that would otherwise be incurred.

Figure 5:
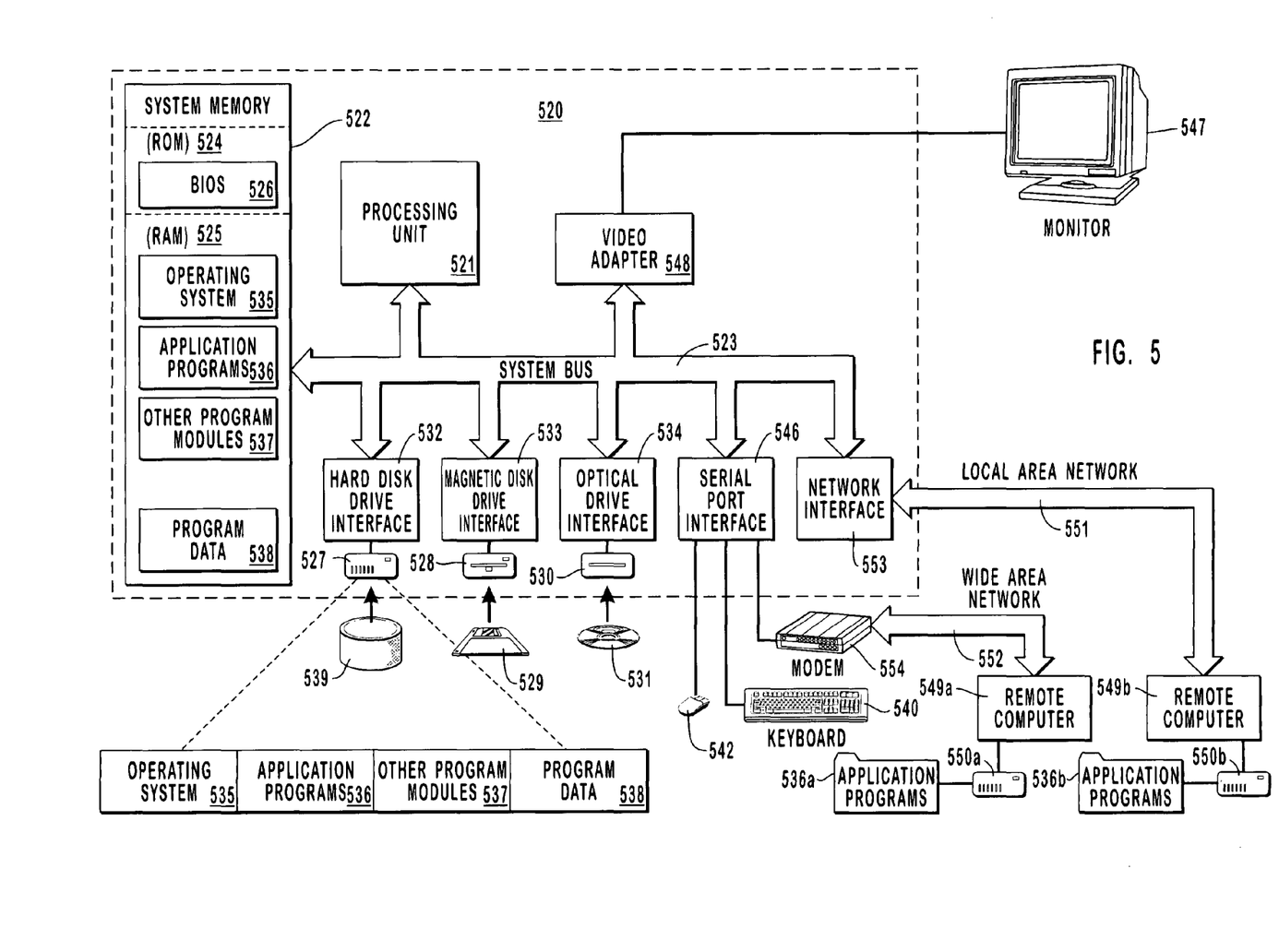
FIG. 5 illustrates a block diagram of one embodiment of a computing environment in which methods of the invention can be practiced.

FIG. 5 and the following discussion are intended to provide a brief, general description of a suitable computing environment in which the invention can be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention can be practiced in network computing environments with many types of computer system configurations, including personal computers, hand-held devices, multi-processor systems, microprocessor-based or programmable consumer electronics, network PCs, minicomputers, mainframe computers, and the like. The invention can also be practiced in distributed computing environments where tasks are performed by local and remote processing devices that are linked (either by hardwired links, wireless links, or by a combination of hardwired or wireless links) through a communications network. In a distributed computing environment, program modules can be located in both local and remote memory storage devices.

With reference to FIG. 5, an exemplary system for implementing the invention includes a general-purpose computing device in the form of a conventional computer 520, including a processing unit 521, a system memory 522, and a system bus 523 that couples various system components including the system memory 522 to the processing unit 521. The system bus 523 can be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, can be stored in ROM 524.

The computer 520 can also include a magnetic hard disk drive 527 for reading from and writing to a magnetic hard disk 539, a magnetic disc drive 528 for reading from or writing to a removable magnetic disk 529, and an optical disc drive 530 for reading from or writing to removable optical disc 531 such as a CD ROM or other optical media. The magnetic hard disk drive 527, magnetic disk drive 528, and optical disc drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disc 531, other types of computer readable media for storing data can be used, including magnetic cassettes, flash memory cards, digital versatile disks, Bernoulli cartridges, RAMs, ROMs, and the like.

Program code means comprising one or more program modules can be stored on the hard disk 539, magnetic disk 529, optical disc 531, ROM 524 or RAM 525, including an operating system 535, one or more application programs 536, other program modules 537, and program data 538. A user can enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices can be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 can operate in a networked environment using logical connections to one or more remote computers, such as remote computers 549a and 549b. Remote computers 549a and 549b can each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 can include a modem 554, a wireless link, or other means for establishing communications over the wide area network 552, such as the Internet. The modem 554, which can be internal or external, is connected to the system bus 523 via the serial port interface 546. In a networked environment, program modules depicted relative to the computer 520, or portions thereof, can be stored in the remote memory storage device. It will be appreciated that the network connections shown are exemplary and other means of establishing communications over wide area network 552 can be used.

The present invention can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. In a computerized network environment including a client system, a network provider, and one or more devices that can be accessed locally or over a network, a method for providing the client system access to one or more of the devices through the network provider, the method comprising the following:

an act of identifying the one or more devices that can be accessed locally or over a network that includes a plurality of devices having unique device identifiers, wherein the one or more devices includes at least one device that is a virtual SCSI device accessible through an iSCSI protocol;

an act of generating a target that identifies a set of the one or more devices, and that includes at least one corresponding unique device identifier, wherein the set of one or more devices is determined based on each of the devices having at least one common group of clients authorized to access the device, and wherein a plurality of logical unit numbers (LUNs) are assigned to the unique device identifier corresponding to the set of one or more devices, wherein the plurality of LUNs are relevant only within the target corresponding to the set of one or more devices, such that multiple devices, partitions, and files can be assigned at least a same LUN of the plurality of LUNs;

an act of associating client authorization information identified by the network provider with the target that identifies the set of the one or more devices; and an act of dynamically assigning the target to a port through a protocol-independent port driver at the network provider, such that only clients authorized by the associated client information are allowed to access the assigned port, thereby allowing only the clients access to the set of the one or more devices through the target, wherein the assignment of the port is dependent upon load balancing of the network provider.

2. The method as recited in claim 1, wherein the set of the one or more devices can be accessed locally through a local access protocol.

3. The method as recited in claim 1, wherein the set of the one or more devices is a network device that can be accessed on a network through a network access protocol.

4. The method as recited in claim 1, wherein the act of identifying a set of one or more devices further includes an act of creating one or more devices that can be accessed over the network.

5. The method as recited in claim 4, wherein the act of creating one or more devices includes an act of identifying at least one of a partition or file, wherein the at least one of a partition or file represents at least a portion of one of the set of one or more devices, and wherein the at least one of the partition or file can be configured by the network provider to provide the client modifiable access to the portion of the set of one of the one or more devices, and wherein the at least one of the partition or file is assigned one of the LUNs.

6. The method as recited in claim 1, further comprising an act of providing client access to one or more of a port, a WWN, and a portal through the protocol-independent port driver, such that the protocol-independent port driver is accessed through one or more protocol-dependent mini-ports.

7. The method as recited in claim 6, wherein the protocol-independent port driver and one or more protocol-dependent mini-port drivers are managed by the centralized service, and wherein the one or more protocol-dependent miniport drivers plug-in to the protocol-independent port driver.

8. The method as recited in claim 7, wherein at least one of the one or more protocol-dependent miniport drivers communicates through one or more of an Ethernet, Token Ring, fiber channel, USB, or wireless protocol.

9. The method as recited in claim 1, wherein the virtual SCSI device is a storage device, and the network comprises a storage area network.

10. The method as recited in claim 9, wherein the storage device is one or more of an internal or external magnetic storage medium, an optical storage medium, and a tape backup drive.

11. The method as recited in claim 1, wherein the network provider manages one or more targets, one or more drivers, and authentication information for one or more clients through a centralized directory service.

12. The method as recited in claim 11, wherein the network device identifier is identified by a target name and a LUN that has been assigned to the at least one device by the centralized directory service.

13. In a computerized network environment including a client system, a network provider, and one or more devices that can be accessed locally or over a network, a computer-readable storage device having stored thereon computer-executable instructions that when executed, cause a computing system to perform a method for providing the client system access to one or more of the devices over the network through the network provider, the method comprising the following:

an act of identifying a set of the one or more devices that can be accessed locally or over a network that includes a plurality of devices corresponding to unique device identifiers, wherein the one or more devices includes at least one device that is a virtual SCSI device accessible through an iSCSI protocol;

an act of generating a target that identifies the set of the one or more devices, and that includes at least one corresponding unique device identifier, wherein the set of one or more devices is identified based on each of the devices having at least one common group of clients authorized to access the devices, and wherein a plurality of logical unit numbers (LUNs) are assigned to the unique device identifier corresponding to the set of one or more devices, wherein the plurality of LUNs are relevant only within the target corresponding to the set of one or more devices, such that multiple devices, partitions, and files can be assigned a same one of the plurality of LUNs;

an act of associating client authorization information identified by the network provider with the target that identifies the set of the one or more device, wherein only clients having client authorization information associated with the target can access the devices identified by the target; and an act of dynamically assigning the target to a port through a protocol-independent port driver at the network provider, such that only clients authorized by the associated client information are allowed to access the assigned port, thereby allowing only the clients access to the set of the one or more device through the target, wherein the assignment of the port is dependent upon load balancing of the network provider.

14. The computer-readable storage device as recited in claim 13, wherein the set of the one or more devices can be accessed locally through a local access protocol.

15. The computer-readable storage device as recited in claim 13, wherein the set of the one or more devices is a network device that can be accessed on a network.

16. The computer-readable storage device as recited in claim 13, wherein the act of identifying a set of one or more devices further includes an act of creating one or more devices that can be accessed over the network.

17. The computer-readable storage device as recited in claim 16, wherein the act of creating one or more devices includes an act of identifying at least one of a partition and file, wherein the at least one of a partition and file represents at least a portion of one of the one or more devices, and wherein the at least one of a partition and file can be configured by the network provider to provide the client modifiable access to the portion of the one of the one or more devices.

18. The computer-readable storage device as recited in claim 13, with the method caused by the execution of the computer-executable instructions further comprising an act of providing client access to one or more of a port, a WWN, and a portal through the protocol-independent port driver, such that the protocol-independent port driver is accessed through one or more protocol-dependent mini-ports.

19. The computer-readable storage device as recited in claim 18, wherein the protocol-independent port driver and one or more protocol dependent mini-port drivers are managed by the centralized service, and wherein the one or more protocol-dependent miniport drivers plug-in to the protocol-independent port driver.

20. The computer-readable storage device as recited in claim 19, wherein at least one of the one or more miniport drivers communicates through one or more of an Ethernet, Token Ring, fiber channel, USB, or wireless protocol.

21. The computer-readable storage device as recited in claim 13, wherein the virtual SCSI device is a storage device, and the network comprises a storage area network.

22. The computer-readable storage device as recited in claim 21, wherein the storage device is one or more of an internal or external magnetic storage medium, an optical storage medium, and a tape backup drive.

23. The computer-readable storage device as recited in claim 13, wherein the network provider manages one or more targets, one or more drivers, and authentication information for one or more clients through a centralized directory service.

24. The computer-readable storage device as recited in claim 23, wherein the device identifier is identified by a target name and a LUN that has been assigned to the at least one device by the centralized directory service.

25. The computer-readable storage device as recited in claim 24, wherein the LUN of the device identifier is assigned the unique device identifier of the target, and to one or more of: a plug-and-play identifier for a device, a global unique identifier for a device; a device driver that interfaces with a device; or least one of a partition or file that represents a portion of a device.

26. In a computerized network environment including a client system, a network provider, and one or more devices that can be accessed locally or over a network, a method for providing the client system access to one or more of the devices over the network through the network provider, the method comprising the following:

an act of identifying a set of the one or more partitions or files representing portions of devices that can be accessed locally or over a network, the set being based on one or more partitions or files having commonly authorized client access and consisting of only partitions or files to which the client has been assigned and to which the client is to be provided access, wherein the one or more partitions or files are on at least one device that is a virtual SCSI device accessible through an iSCSI protocol;

an act of generating a target that identifies the set of the one or more partitions or files, and that includes at least one corresponding device identifier, wherein the set of one or more partitions or files is identified based on each of the devices having at least one common group of clients authorized to access the devices, and wherein the at least one corresponding device identifier is a logical unit number (LUN) assignable to multiple, different partitions or files, and which is given relevance only when associated with a unique device identifier;

an act of associating client authorization information identified by the network provider with the target that identifies the set of the one or more partitions or files; and a step for dynamically exposing the set of the one or more partitions or files to the client through a specific one of a dynamically assigned network port, a WWN, and a portal, such that the client can access the set of the one or more partitions or files identified by the target when the client has access to the specific one of a dynamically assigned network port, a WWN, and portal, and when the client presents the associated client authorization to the network provider.

27. The method as recited in claim 26, wherein the step for exposing the set of the one or more devices to the client through a specific one of a network port, a WWN, and a portal comprises:

an act of assigning the target to a port through a protocol-independent port driver at the network provider; and an act of providing client access to the specific one of a port, a WWN, and a portal through the protocol-independent port driver, such that the protocol-independent port driver is accessed through one or more protocol-dependent mini-ports.

28. The method as recited in claim 27, wherein the client is provided access to the specific one of a port, a WWN, and a portal by virtue of being authenticated at one or more of a local centralized service provider, and a remote authentication database.

29. In a computerized environment including a client computer and a storage service provider on a storage area network, the storage service provider comprising one or more storage devices, a method of providing the client computer with access to one or more of the storage devices on the storage service provider through an iSCSI protocol, the method comprising the following:

an act of identifying one or more device identifiers corresponding to one or more partitions or files representing storage devices on a storage service provider, wherein the partitions or files allow access to portions of the storage devices and enable a first device type to emulate a second device type, wherein the one or more device identifiers includes a target name and a LUN that has been assigned to the one or more partitions or files by a centralized directory service;

an act of receiving from the centralized directory service a modifiable client resource that identifies client authorization to access the storage device, and a portion of the storage device that the client can access, wherein the centralized directory maintains authentication information for the client, and at least one of a work group identity, network location, and physical location, and further maintains LUN information for the one or more partitions or files and configuration information defining how the client accesses a partition or file representing a storage device, wherein the centralized directory service includes the same LUN assigned to multiple, different partitions or files, such that a LUN has relevancy only within a particular target;

an act of creating a target containing a plurality of logical unit numbers that have been assigned to the identified device identifiers, the target consisting of only logical units numbers to which the client has been assigned and to which the client is to be provided access, wherein the client can access only those storage devices represented by a logical unit number contained in the target using storage service provider, and wherein access to the target is provided according to the modifiable client resource;

an act of providing the client computer access to the file or partition representing the storage device identified by the target through a client-restricted port on the storage service provider, wherein the client restricted port is dynamically assigned by the centralized directory service based on storage service provider load balancing and failover protection, such that when the client has knowledge of, access to, the client-restricted port, the client can access the storage device by providing the storage service provider with client authorization and a Uniform Resource Locator including the dynamically assigned port number.

30. The method as recited in claim 29, wherein the centralized directory service receives client access information from at least one of a local and remote database.

31. The method as recited in claim 29, wherein the client-restricted port is managed by the centralized service and a protocol-independent port driver that receives network traffic through one or more protocol-dependent mini-port drivers.

32. The method as recited in claim 31, wherein the one or more protocol-dependent mini-port drivers are plug-ins to the protocol-independent port driver.

33. The method as recited in claim 32, wherein at least one of the one or more mini-port drivers communicates through a Token Ring protocol.

* * * * *